United States Patent Office 2,757,733
Patented Aug. 7, 1956

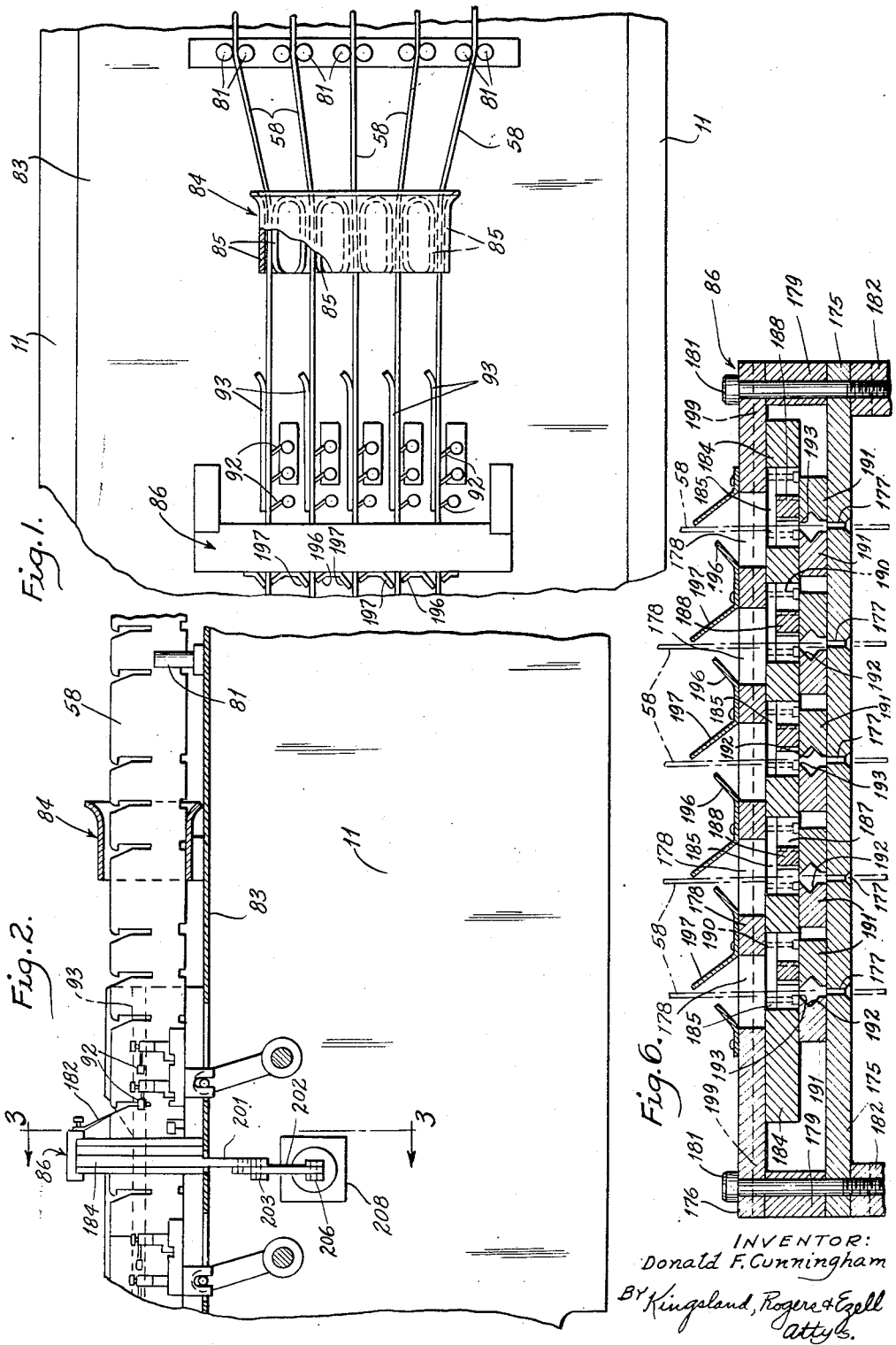

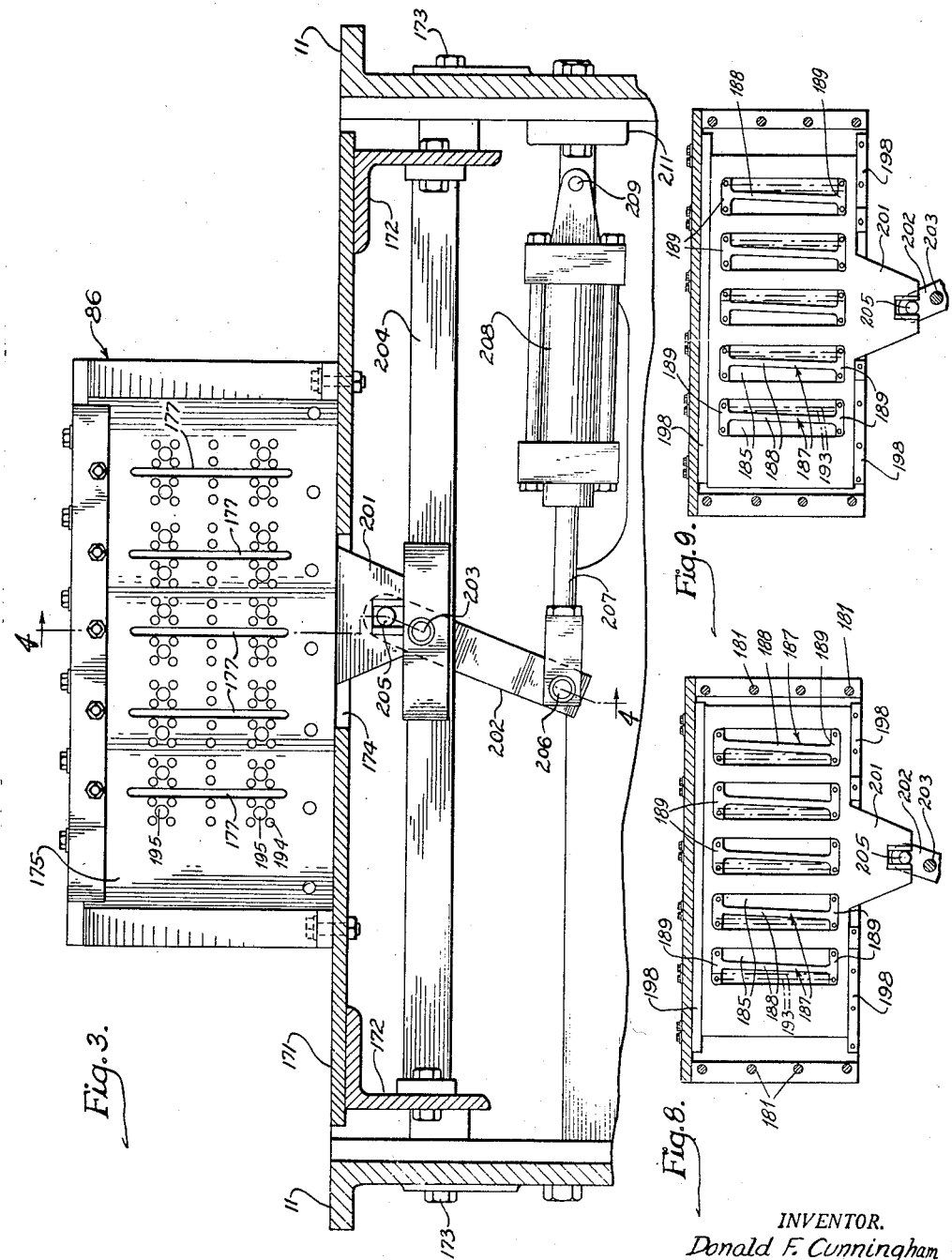

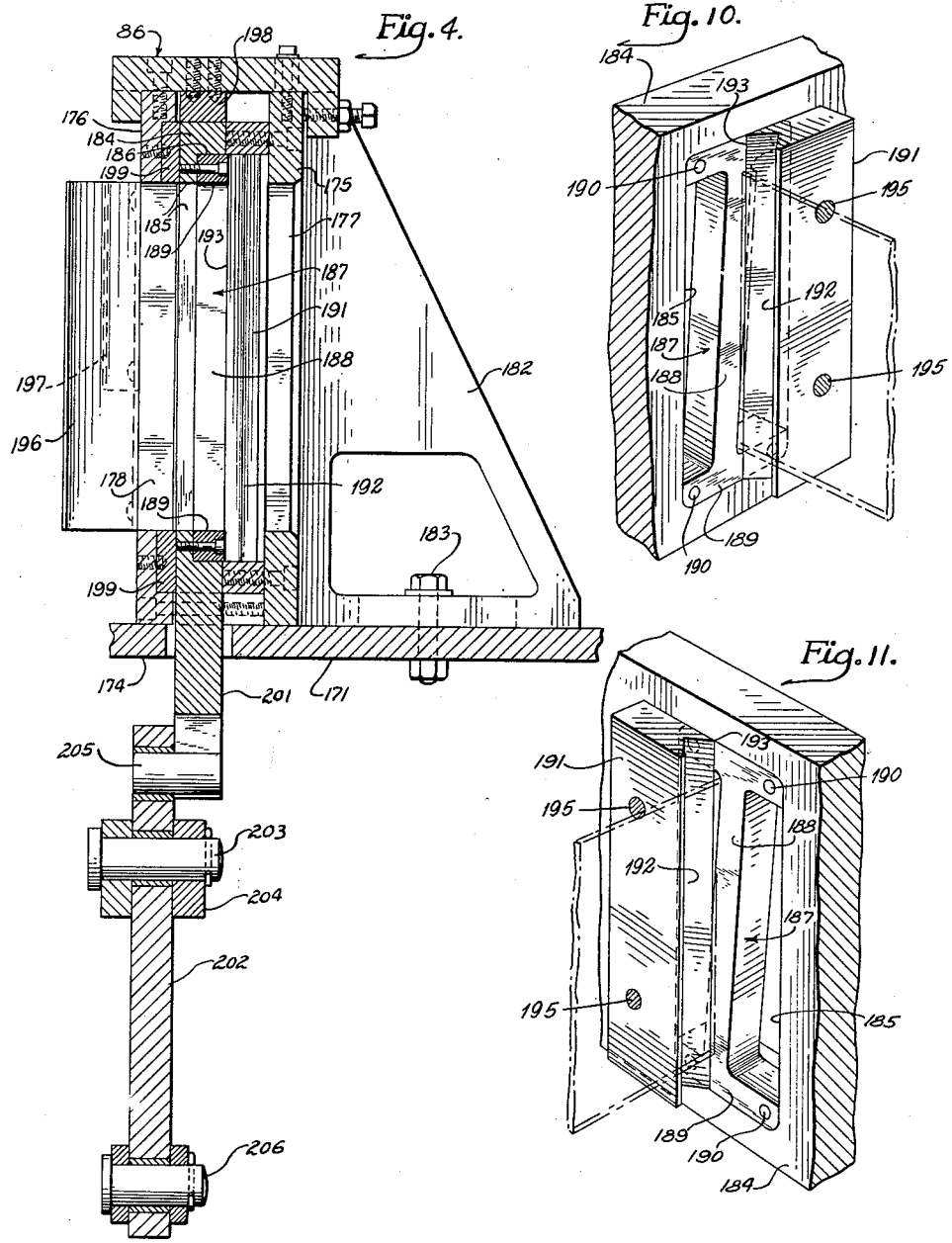

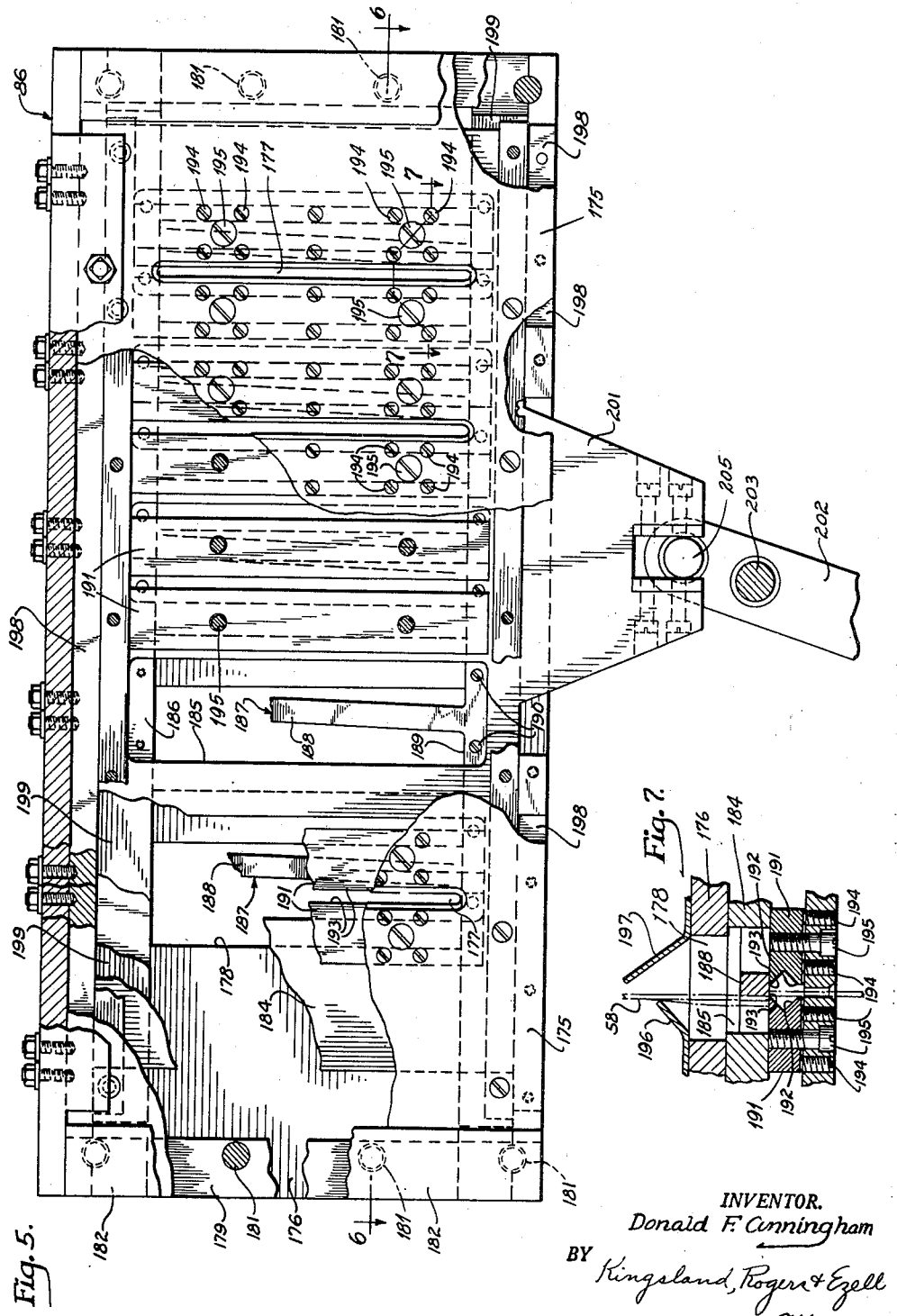

2,757,733
DOUBLE EDGED RECIPROCABLE CUTTING DEVICE

Donald F. Cunningham, Whitefish Bay, Wis., assignor, by mesne assignments, to Standard Brands Incorporated, New York, N. Y., a corporation of Delaware Original application March 24, 1948, Serial No. 16,768, now Patent No. 2,636,423, dated April 28, 1953. Divided and this application December 26, 1952, Serial No. 328,069

3 Claims. (Cl. 164—58)

This invention relates to improvements in machines for cutting strips of paper, cardboard, or other flexible materials. In particular, this invention concerns improvements in a machine for cutting strips transversely by means of a double-edged reciprocable cutting device which is adapted to operate on a strip automatically fed through the machine.

The machine of this invention is of the type which is designed to cut strips of flexible material into predetermined lengths when the strip is advanced through the machine step-by-step. The machine is so designed that the cutting operation can be preset so as to cut transversely the strip of material being advanced through it at certain lengths according to the desire of the operator. The cutting machine is adapted to receive strips or ribbons of flexible material and guide them along a guideway so that they can be operated upon by a reciprocable double-bladed cutting knife which is controlled by a simple and efficient regulating mechanism according to the manner of operation.

Accordingly, it is a principle object of this invention to provide a novelly constructed cutter adapted for reciprocable operation and which serves to sever transversely flexible strips of material.

Another object is to provide in a machine of the type described simple, efficient and novel means for guiding, spacing and cutting vertically disposed longitudinal strips into predetermined lengths.

A further object is to provide a double-bladed automatically operated cutting mechanism which is adapted to cut automatically advanced flexible strips of material into lengths corresponding to predetermined and regulatable settings.

Other and further objects of the present invention will be apparent from the following description and claims and are illustrated in the accompanying drawings which, by way of illustration, show an exemplary embodiment and the principles thereof. Other embodiments of the invention embodying the same principle may be used, and structural changes may be made as desired by those skilled in the art without departing from the present invention in the purview of the appended claims.

This application is a division of my copending application Serial No. 16,768, filed March 24, 1948, which has matured into U. S. Patent No. 2,636,423, granted April 28, 1953. The same reference numerals are employed herein.

In the drawings:

Fig. 1 is a schematic plan view of the cutting machine associated with strip guiding means mounted on a base support;

Fig. 2 is a side elevation of the machine illustrated in Fig. 1;

Fig. 3 is a transverse sectional view taken substantially on line 3—3 of Fig. 2, showing the strip cutting mechanism and the actuating means therefor in elevation;

Fig. 4 is a vertical sectional view through the cutting mechanism and drive, taken substantially on line 4—4 of Fig. 3;

Fig. 5 is an enlarged elevational view of the ribbon cutting mechanism, viewed in the same direction as illustrated in Fig. 3, but showing portions thereof progressively broken away to illustrate the structure and detail;

Fig. 6 is a horizontal sectional view of the cutting mechanism, taken substantially on line 6—6 of Fig. 5;

Fig. 7 is a horizontal sectional detail view taken substantially along the line 7—7 of Fig. 5;

Figs. 8 and 9 are schematic sectional elevational views of the cutting mechanism showing the reciprocal cutter in each of its two positions of rest;

Fig. 10 is a fragmentary perspective view of the reciprocal cutter showing one knife thereof in a cutting position assumed during a cutting operation while the cutter is moving from the rest position shown in Fig. 9 into the rest position shown in Fig. 8;

Fig. 11 is a fragmentary perspective view similar to Fig. 10, but showing the cutter knife in a cutting position assumed while the cutter is moving from the rest position shown in Fig. 8 into the rest position illustrated in Fig. 9.

Referring now to the accompanying drawings, the improved cutting machine is shown generally indicated at 86, and is mounted on the top of a flat support 83 which is provided with side frame members 11 as is shown in Figs. 1 and 2. Associated with the cutting machine 86 is a strip feeding and guiding device shown generally at 84. A plurality of strips or flexible ribbons 58 are shown in Fig. 1 as being positioned between pairs of posts 81 projecting from the flat support 83. The guideway or spacer guide generally indicated at 84 is also mounted on the flat support 83 and is substantially funnel-shaped at its forward or strip receiving end and is provided with a plurality of pairs of vertical walls 85 between each pair of which one of the strips extends. The strips 58 then extend from the funnel-shaped guideways 84 to the cutting or shearing mechanism which is generally indicated at 86.

It will be observed that the shearing mechanism 86 is centrally mounted upon the machine midway between the side frames 11, and this mounting includes a horizontal bedplate 171 mounted at its edges on angle bars 172 which are firmly secured, as by bolts 173, to the side frames. The bedplate 171 is provided with an opening 174 through which operating means for the shearing mechanism extends. Extending upwardly from the bedplate 171 is a pair of spaced parallel plates 175 and 176. The front plate 175, which is disposed substantially vertically, has a plurality of vertical slots 177 therein which are spaced apart longitudinally thereof distances corresponding to the spacing between the strips 58. The other or rear plate 176 is similarly provided with slotted vertical openings 178 which are substantially coextensive with the slots 177 and in registering alignment therewith. However, the openings 178 are considerably wider than the slots 177 for purposes that will appear below. The plates 175 and 176 are held in spaced relationship by end spacers 179 and the assembly is firmly secured at each end, as by bolts 181, to mounting brackets 182, which brackets are substantially triangular in shape and have their bases firmly secured, as by bolts 183, to the bedplate 171.

A horizontally reciprocable plate 184 is mounted within the space between the spaced vertical plates 175 and 176. This plate 184 is of a length substantially less than the space between the end spacers 179 and is provided with a plurality of longitudinally spaced, substantially rectangular openings 185 of such width as to permit strips 58 to extend therethrough without interference when the latter are threaded through the registering openings 177 and 178. The upper and lower margins of the substantially rectangular openings 185 in the reciprocable plate 184 are suitably recessed, as at 186, to afford mounting surfaces for cutter blades indicated generally by the numeral 187. As is perhaps best shown in Figs. 8 and 10, a cutter blade is mounted in each opening 185. These blades are of a substantially H-shaped configuration with the bar 188 of the H inclined slightly out of the vertical and the leg portions 189 of the H nested in the recesses 186. Suitable machine screws 190 are provided to secure the cutter blades in place firmly on the reciprocable plate 184.

The cutting edges of the vertically inclined cutter blades 187 are adapted to cooperate with fixed cutting edges associated therewith. As best shown in Figs. 5, 7 and 11, fixed cutting edges are provided upon a series of vertically disposed bars 191, one of which is disposed on either side of each vertical slot 177 in the front plate 175. Each of the bars 191 has a substantially V-shaped edge 192 which defines a cutting edge 193 disposed in close proximity to the related cutter blade 187. Each bar 191 is mounted for adjustment towards and away from the related cutter blade so as to be adjustable with relation to said blade for insuring the proper shearing of a strip extended therethrough. Such adjustment is best effected by providing a plurality of pressure screws 194 in the front plate 175 which have their inner ends bearing against one face of the related bar 191. Preferably, four such screws are provided in the area of each mounting screw 195. It should be evident that the bars 191 may be moved towards or away from the cutter blades 187 upon initially loosening the pressure screws 194 and then adjusting the position of the bars 191 by manipulation of the holding screws 195, after which the pressure screws 194 may again be moved into firm contact with the newly positioned bar 191.

*Operation*

In operation, the reciprocable plate 184 carrying the cutter blades 187 is moved in one direction only each time the strips 58 are to be sheared. The construction of the cutter blades 187 is such that either edge of the bar portion 188 thereof may cooperate with one or the other shearing edge 193 of the related bars 191. Thus, when the strips 58 extend through the openings 185 of the reciprocable plate 184 on the left-hand side of the cutter bars 187, as is illustrated in Figs. 8 and 11, the strips will be sheared by said cutter bar when said plate is moved to the left. The wide slots 178 permit movement of the rear portions of severed strips 58 laterally under the action of the rectangular cross-section cutter bars 188 (Fig. 7), which eliminates damage which would otherwise occur. The reciprocable plate 184 remains in this position while the strips 58 are again fed step-by-step through the shearing mechanism. This results in the strips passing through the openings 185 on the right-hand side of the cutter bars 187, as best indicated in Figs. 7 and 10. As soon as a predetermined number of step-by-step advances have occurred, the reciprocable plate 184 then is moved to the right to carry thereby the cutter bar 187 through the strips to dispose said cutter bar on the right-hand side thereof during the subsequent feeding operation. This intermittent movement of the reciprocable plate 184 is repeated following the assembly of successive partitions. If desired, stabilizing plates 196—197 may be secured to the outside face of the rear plate 176, one on each side of each opening 177. Wear plates 198 may be provided in the cutter assembly for both the top and bottom edges of the reciprocable plate 184 and similar wear plates 199 may be carried on the inside face of the rear plate 176.

The stabilizing plates 196—197 prevent the severed partition strips 58 from being moved clear out of line, as is manifest from Figure 7, and cooperate with the greater width of the slots 185 in plate 184 which prevent the severed partition strips 58 from being damaged. The tail end of the severed partition strip 58 can be moved as required, yet the stabilizing plates 196—197 are, in effect, pivots about which this action takes place which prevents the whole severed strip 58 from being pushed over to one side which could well interfere with the action of the mechanism which moves the strip 58 forward into position for further operations.

Reciprocation of the cutter plate 184 may be obtained by any suitable means; however, it is preferable that hydraulic means be provided owing to the necessity of positive operation in both directions. Upon again referring to Figs. 3 and 4, it will be observed that the reciprocable plate 184 has a lug 201 depending downwardly through the opening 174 in the bedplate 171. The upper end of a link 202, which is pivotally mounted at 203 to a crossbar 204, has a pin and slot connection as at 205 with the depending portion 201.

The lower end of said link 202 is connected, as at 206, to the end of a piston rod 207 extending out of a hydraulic cylinder 208 which, for freedom of operation, is pivotally mounted at 209 on a bracket 211 firmly secured to the inside face of one of the side frames 11. A piston carried on the piston rod within the cylinder 208 is actuated in both directions by means of hydraulic pressure obtained from any suitable source so as to be actuated in timed sequence to the actuation of the feeding and shearing mechanism. In this manner, the piston rod 207 will move in one direction or the other each time a predetermined length of strip has been fed to the shearing mechanism.

Although an exemplary embodiment of the invention has been disclosed herein, it should be quite evident that the machine as a whole is capable of embodying a wide variety of modifications in detail structure. It should be evident also that the strip shearing or cutting mechanism is such as to insure clean and positive shearing of the strips at predetermined intervals of machine operation and that said mechanism may embody modifications in its detail structure and in its mode of operation, all without departing from the spirit of the invention or the scope of the appended claims.

What is claimed is:

1. A cutter assembly for severing partition assembly forming material comprising a support, a pair of spaced plates mounted on said support, each plate having spaced vertical slots, the slots of one plate being in alignment with the slots in the other plate, said slots being of a size to permit passage therethrough of a continuous edgewise partition strip, a pair of spaced opposed stationary bars between said plates adjacent each slot of one plate, each bar having a cutting edge, a blade reciprocably mounted between said plates adjacent each pair of bars for movement thereacross, each blade having two flat faces, one flat face cooperating with each stationary cutting edge for severing a partition strip extending through aligned slots, and means for reciprocating said blade.

2. A cutter assembly for severing partition assembly forming material comprising a support, a pair of spaced plates mounted on said support, each plate having spaced vertical slots, the slots of one plate being in alignment with the slots in the other plate, said slots being of a size to permit passage therethrough of a continuous edgewise partition strip, a pair of spaced opposed stationary bars between said plates adjacent each slot of one plate, each bar having a cutting edge, a blade reciprocably mounted between said plates adjacent each pair of bars for movement thereacross, each blade having two flat faces, one flat face cooperating with each stationary cutting edge for severing a partition strip extending through aligned slots, and means for reciprocating said blade, the slots in said plate adjacent said blades being of a width substantially greater than the thickness of strip material fed therethrough to permit lateral movement of the portion of a severed strip engaged by the reciprocative blade in the severing operation.

3. A cutter assembly for severing partition assembly forming material comprising a support, a pair of spaced plates mounted on said support, each plate having spaced vertical slots, the slots of one plate being in alignment with the slots in the other plate, said slots being of a size to permit passage therethrough of a continuous edgewise partition strip, a pair of spaced opposed stationary bars between said plates adjacent each slot of one plate, each bar having a cutting edge, a blade reciprocably mounted between said plates adjacent each pair of bars for movement thereacross, each blade having two flat faces, one flat face cooperating with each stationary cutting edge for severing a partition strip extending through aligned slots, means for reciprocating said blade, the slots in said plate adjacent said blades being of a width substantially greater than the thickness of strip material fed therethrough to permit lateral movement of the portion of a severed strip engaged by the reciprocative blade in the severing operation, and a pair of spaced partition stabilizing plates mounted adjacent the exit of each slot in the plate adjacent said blades, one stabilizing plate at a time of each pair being engageable by a severed partition strip as said blade forces it out of line in the cutting action.

References Cited in the file of this patent

UNITED STATES PATENTS

| | | |
|---|---|---|
| 384,847 | Hinsdale | June 19, 1888 |
| 509,989 | Wilton | Dec. 5, 1893 |
| 533,312 | McCombs | Jan. 29, 1895 |
| 866,050 | Ney | Sept. 17, 1907 |
| 984,887 | Briede | Feb. 21, 1911 |
| 1,148,896 | Guderjahn | Aug. 3, 1915 |
| 1,714,785 | Hudson | May 28, 1929 |
| 1,756,955 | Rife | May 6, 1930 |
| 1,936,928 | Batchelor | Nov. 28, 1933 |
| 2,258,348 | Biggert | Oct. 7, 1941 |
| 2,363,097 | Sutter | Nov. 21, 1944 |

FOREIGN PATENTS

| | | |
|---|---|---|
| 489,561 | Germany | Jan. 20, 1930 |